US012571589B2

(12) United States Patent
Lee et al.

(10) Patent No.: US 12,571,589 B2

(45) Date of Patent: Mar. 10, 2026

(54) DRYING STORAGE

(71) Applicant: HU-master Inc., Seoul (KR)

(72) Inventors: Dae Young Lee, Seoul (KR); Hyeong Ki Kim, Cheonan-si (KR)

(73) Assignee: HU-master Inc., Seoul (KR)

(*) Notice: Subject to any disclaimer, the term of this patent is extended or adjusted under 35 U.S.C. 154(b) by 584 days.

(21) Appl. No.: 18/119,822

(22) Filed: Mar. 10, 2023

(65) Prior Publication Data

US 2023/0314074 A1 Oct. 5, 2023

(30) Foreign Application Priority Data

Mar. 14, 2022 (KR) ........................ 10-2022-0031471

(51) Int. Cl.

| | |
|---|---|
| ***F26B 21/08*** | (2006.01) |
| ***F24F 3/14*** | (2006.01) |
| ***F24F 3/153*** | (2006.01) |
| ***F26B 9/02*** | (2006.01) |

(52) U.S. Cl.

CPC ............ *F26B 21/083* (2013.01); *F24F 3/153* (2013.01); *F26B 9/02* (2013.01); *F24F 2003/144* (2013.01); *F24F 2003/1458* (2013.01)

(58) Field of Classification Search

CPC ........ F26B 21/083; F26B 9/02; F26B 21/028; F26B 21/04; F26B 21/10; F24F 3/153; F24F 2003/144; F24F 2003/1458; F24F 3/1411

See application file for complete search history.

(56) References Cited

U.S. PATENT DOCUMENTS 4,769,053 A * 9/1988 Fischer, Jr. .......... B01D 53/261 96/144

4,898,599 A * 2/1990 Settlemyer ........... B01D 53/261 95/126

5,392,177 A * 2/1995 Chainer ............... G11B 23/507 360/99.18

(Continued)

FOREIGN PATENT DOCUMENTS

JP 04-184079 A 7/1992

KR 10-2300902 B1 9/2021

OTHER PUBLICATIONS

Dae-Young Lee et al., "Analytical modeling of a desiccant wheel", International Journal of Refrigeration, vol. 42, Jun. 2014, pp. 97-111.

(Continued)

*Primary Examiner* — David J Laux

(74) *Attorney, Agent, or Firm* — Revolution IP, PLLC

(57) ABSTRACT

A drying storage according to the present invention can be carried or moved by a user or installed as a built-in in the user's residence, and can maintain an object in a dried state after drying the object to be dried, so that the convenience of use can be improved, wherein a desiccant material with an equilibrium moisture content suitable for the temperature and humidity conditions in which the drying storage is used, is applied so that the inside air of the drying storage is inhaled during a dehumidification operation to allow sufficient dehumidification and the outside air of the drying storage is inhaled during a regeneration operation to enable sufficient regeneration of the desiccant material.

10 Claims, 5 Drawing Sheets

(56) References Cited

U.S. PATENT DOCUMENTS

| | | | | |
|---|---|---|---|---|
| 6,199,388 | B1 * | 3/2001 | Fischer, Jr. | F24D 5/04<br>62/271 |
| 2009/0173376 | A1 * | 7/2009 | Spencer | H10F 77/488<br>126/569 |
| 2019/0390906 | A1 * | 12/2019 | Wu | F26B 21/02 |

OTHER PUBLICATIONS

Hyungmook Kang et al., "Explicit analytic solution for heat and mass transfer in a desiccant wheel using a simplified model", Energy, vol. 93, Part 2, Dec. 15, 2015, pp. 2559-2567.

Hyungmook Kang et al., "Analytic solution to predict the outlet air states of a desiccant wheel with an arbitrary split ratio", Energy, vol. 153, Jun. 15, 2018, pp. 301-310.

* cited by examiner

DRYING STORAGE

CROSS-REFERENCE TO RELATED APPLICATION

This application claims the benefit of Korean Patent Application No. 10-2022-0031471, filed on Mar. 14, 2022, in the Korean Intellectual Property Office, the disclosure of which is incorporated herein in its entirety by reference.

TECHNICAL FIELD

The present invention relates to a drying storage, and more particularly, to a drying storage in which an object being dried is kept in a dried state.

BACKGROUND ART

In general, dehumidifiers are devices for removing moisture from indoor air to make a pleasant indoor environment.

A dehumidifier according to the related art includes a compressor, a condenser, an expansion mechanism, and an evaporator and is configured to condense water vapor in the air and to control humidity.

However, because the dehumidifier according to the related art includes the compressor, the volume of the dehumidifier is large, and power consumption of the dehumidifier is large. Due to these problems, there are limitations of installation and usage.

DISCLOSURE OF THE INVENTION

The present invention provides a drying storage which has a simple structure and improved convenience of use.

According to an aspect of the present invention, there is provided a drying storage, which can be carried or moved by a user or is installed as a built-in in the user's residence and in which an object being dried is kept in a dried state, the drying storage including: a drying storage case having a receiving port through which the object being dried is capable of being put in or withdrawn and having an accommodation space in which the object being dried is capable of being accommodated; a receiving port door coupled to the drying storage case to open/close the receiving port; a dehumidifier case including an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber; a blower configured to flow the air in the dehumidifier case; a desiccant filter disposed in the dehumidification chamber and including a desiccant material for absorbing moisture in the air introduced from the intake chamber during a dehumidification operation; a regeneration heater configured to heat the air introduced from the intake chamber and to allow the air to flow into the desiccant filter so as to regenerate the desiccant filter during a regeneration operation; and a controller configured to control an operation of the blower and the regeneration heater, wherein the desiccant material has an equilibrium moisture content of 20 wt % or less when a temperature of an ambient air is in a range of 10° C. to 30° C. and relative humidity is 20% or less, and has an equilibrium moisture content of 40 wt % or more when the temperature of the ambient air is in a range of 10° C. to 30° C. and relative humidity is 50% or more so that the moisture absorption capacity increases during the dehumidification operation, and the controller is further configured to control the regeneration heater or the blower so that the regeneration temperature of the desiccant filter is 60° C. or less to prevent damage of the drying storage itself or surrounding items of the drying storage due to high-temperature air discharged from the exhaust chamber during the regeneration operation, and the desiccant material has an equilibrium moisture content of 20 wt % or less when the temperature of the ambient air is 40° C. to 60° C. and relative humidity is 20% or less so that a regeneration ability is enhanced in the regeneration operation.

The drying storage may further include a sealing member provided between the receiving port and the receiving port door to seal the accommodation space.

The drying storage may further include: a drying storage intake port, which is formed in the drying storage case and through which outside air of the drying storage is inhaled; an external intake port in the intake chamber of the dehumidifier case, which communicates with the drying storage intake port and through which outside air is inhaled into the intake chamber; and an internal intake port in the intake chamber of the dehumidifier case, which communicates with the accommodation space and through which inside air of the accommodation space is inhaled into the intake chamber.

The drying storage may further include an intake damper, which is rotatably coupled to the intake chamber and selectively opens/closes the external intake port, the internal intake port and an entrance of the dehumidification chamber according to an operation mode including the dehumidification operation and the regeneration operation.

The controller may be further configured to control the intake damper to open the internal intake port and the entrance of the dehumidification chamber and to close the external intake port during the dehumidification operation, and the controller is further configured to control the intake damper to close the internal intake port and to open the external intake port and the entrance of the dehumidification chamber during the regeneration operation, and when the regeneration operation is terminated, the controller is further configured to control the intake damper to close the entrance of the dehumidification chamber.

The drying storage may further include: a drying storage exhaust port, which is formed in the drying storage case and through which air discharged from the exhaust chamber is discharged to an outside of the drying storage; an external exhaust port in the exhaust chamber of the dehumidifier case, which communicates with the drying storage exhaust port and through which air in the exhaust chamber is discharged to an outside of the drying storage; and an internal exhaust port in the exhaust chamber of the dehumidifier case, which communicates with the accommodation space and through which air in the exhaust chamber is discharged to an inside of the accommodation space.

The drying storage may further include an exhaust damper, which is rotatably coupled to the exhaust chamber and selectively opens/closes the external exhaust port, the internal exhaust port, and an exit of the dehumidification chamber according to an operation mode including the dehumidification operation and the regeneration operation.

The controller may be further configured to control the exhaust damper to open the internal exhaust port and the exit of the dehumidification chamber and to close the external exhaust port during the dehumidification operation, and the controller may be further configured to control the exhaust damper to close the internal exhaust port and to open the external exhaust port and the exit of the dehumidification chamber during the regeneration operation, and when the regeneration operation is terminated, the controller may be further configured to control the exhaust damper to close the exit of the dehumidification chamber.

According to another aspect of the present invention, there is provided a drying storage, which can be carried or moved by a user or is installed as a built-in in the user's residence and in which an object being dried is kept in a dried state, the drying storage including: a drying storage case having a receiving port through which the object being dried is capable of being put in or withdrawn and having an accommodation space in which the object being dried is capable of being accommodated; a receiving port door coupled to the drying storage case to open/close the receiving port; a sealing member provided between the receiving port and the receiving port door and configured to seal the accommodation space; a dehumidifier case including an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber; a blower configured to flow air in the dehumidifier case; a desiccant filter disposed in the dehumidification chamber and including a desiccant material for absorbing moisture in the air introduced from the intake chamber during a dehumidification operation; a regeneration heater configured to heat the air introduced from the intake chamber and to allow the air to flow into the desiccant filter so as to regenerate the desiccant filter during a regeneration operation; a drying storage intake port, which is formed in the drying storage case and through which outside air of the drying storage is inhaled; an external intake port in the intake chamber of the dehumidifier case, which communicates with the drying storage intake port and through which outside air is inhaled into the intake chamber; an internal intake port in the intake chamber of the dehumidifier case, which communicates with the accommodation space and through which inside air of the accommodation space is inhaled into the intake chamber; an intake damper, which is rotatably coupled to the intake chamber and selectively opens/closes the external intake port, the internal intake port and an entrance of the dehumidification chamber according to an operation mode including the dehumidification operation and the regeneration operation; a drying storage exhaust port, which is formed in the drying storage case and through which air discharged from the exhaust chamber is discharged to an outside of the drying storage; an external exhaust port in the exhaust chamber of the dehumidifier case, which communicates with the drying storage exhaust port and through which the air in the exhaust chamber is discharged to an outside of the drying chamber; an internal exhaust port in the exhaust chamber of the dehumidifier case, which communicates with the accommodation space and through which the air in the exhaust chamber is discharged to an inside of the accommodation space; an exhaust damper, which is rotatably coupled to the exhaust chamber and selectively opens/closes the external exhaust port, the internal exhaust port and an exit of the dehumidification chamber according to an operation mode including the dehumidification operation and the regeneration operation; and a controller configured to control an operation of the blower, the regeneration heater, the intake damper and the exhaust damper, wherein the desiccant material has an equilibrium moisture content of 20 wt % or less when the temperature of an ambient air is in a range of 10° C. to 30° C. and relative humidity is 20% or less, and has an equilibrium moisture content of 40 wt % or more when the temperature of the ambient air is in a range of 10° C. to 30° C. and relative humidity is 50% or more so that the moisture absorption capacity increases during the dehumidification operation, and the controller is further configured to control the regeneration heater or the blower so that the regeneration temperature of the desiccant filter is 60° C. or less to prevent damage of the drying storage itself or surrounding items of the drying storage due to high-temperature air discharged from the exhaust chamber during the regeneration operation, and the desiccant material has an equilibrium moisture content of 20 wt % or less when the temperature of the ambient air is 40° C. to 60° C. and relative humidity is 20% or less so that a regeneration ability is enhanced in the regeneration operation.

According to another aspect of the present invention, there is provided a drying storage, which can be carried or moved by a user or is installed as a built-in in the user's residence and in which an object being dried is kept in a dried state, the drying storage including: a drying storage case having a receiving port through which the object being dried is capable of being put in or withdrawn and having an accommodation space in which the object being dried is capable of being accommodated; a receiving port door coupled to the drying storage case to open/close the receiving port; a dehumidifier case including an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber, the dehumidifier case being disposed inside the drying storage case; a blower configured to flow air in the dehumidifier case; a desiccant filter disposed in the dehumidification chamber and including a desiccant material for absorbing moisture in air introduced from the intake chamber during a dehumidification operation; a regeneration heater configured to heat the air introduced from the intake chamber and to allow the air to flow into the desiccant filter so as to regenerate the desiccant filter during a regeneration operation; and a controller configured to control an operation of the blower and the regeneration heater, wherein the desiccant material has an equilibrium moisture content of 20 wt % or less when the temperature of an ambient air is in a range of 10° C. to 30° C. and the relative humidity of the air is 20% or less, and has an equilibrium moisture content of 40 wt % or more when the temperature of the ambient air is in a range of 10° C. to 30° C. and the relative humidity of air is 50% or more so that the moisture absorption capacity increases during the dehumidification operation, and the controller is further configured to control the regeneration heater or the blower so that the regeneration temperature of the desiccant filter is 60° C. or less to prevent damage of the drying storage itself or surrounding items of the drying storage due to high-temperature air discharged from the exhaust chamber during the regeneration operation, and the desiccant material has an equilibrium moisture content of 20 wt % or less when the temperature of the ambient air is in a range of 40° C. to 60° C. and the relative humidity of air is 20% or less so that a regeneration ability is enhanced in the regeneration operation, and the desiccant material has an equilibrium with the air of relative humidity 20% or less at a time point when the desiccant material is regenerated in the previous regeneration operation and cooled naturally before the next dehumidification operation starts.

DETAILED DESCRIPTION FOR CARRYING OUT THE INVENTION

Hereinafter, the present invention will be described in detail with reference to the accompanying drawings, in which exemplary embodiments of the invention are shown.

Figure 1:
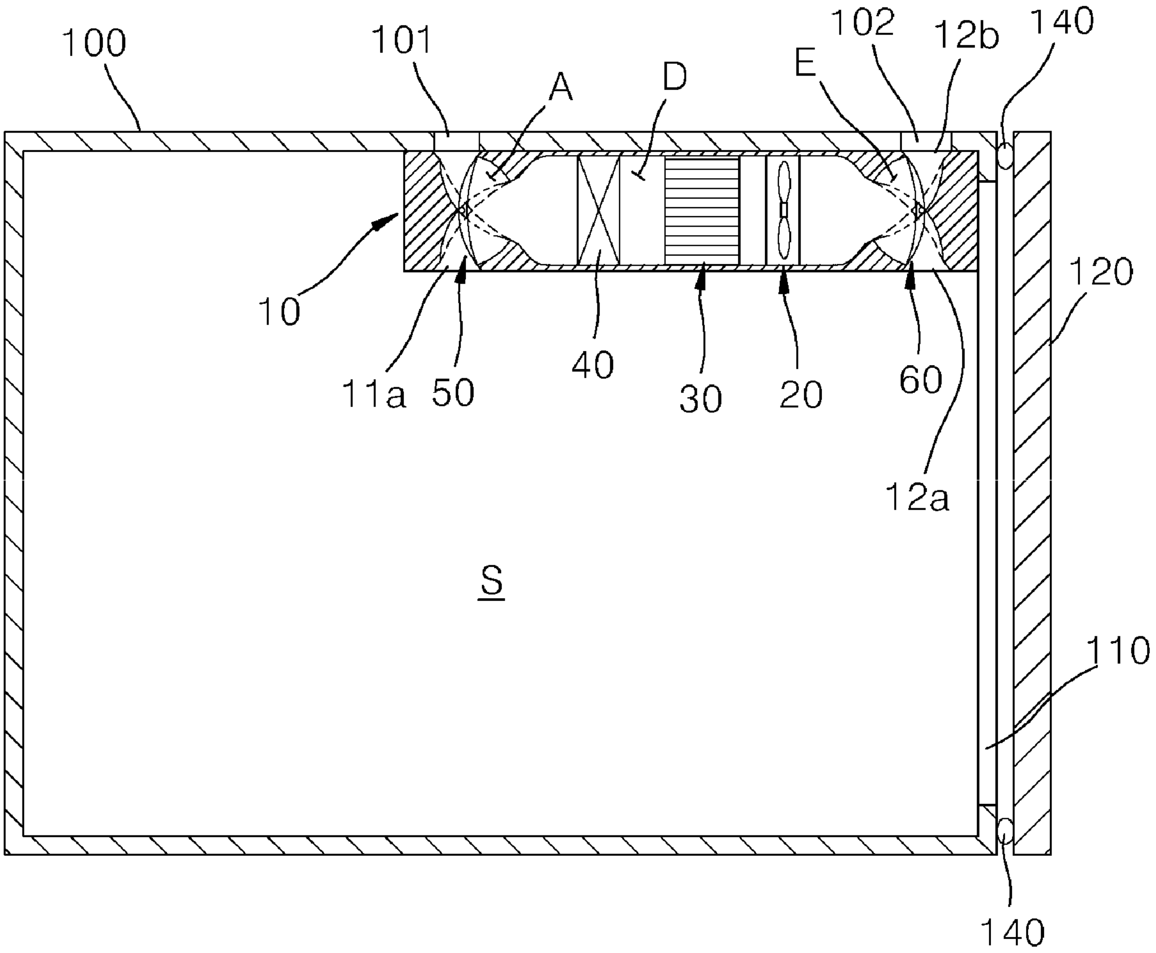
FIG. 1 is a view illustrating a drying storage according to an embodiment of the present invention.

FIG. 1 illustrates a drying storage according to an embodiment of the present invention.

Referring to FIG. 1, the drying storage according to an embodiment of the present invention is a drying storage, which can be carried or moved by a user or is installed as a built-in in the user's residence and in which an object being dried is kept in a dried state. Here, the object being dried includes any grain, powder, dried food, etc., as long as it needs to be kept in the dried state.

The drying storage includes a drying storage case 100, a receiving port door 120, a dehumidifier case 10, a blower 20, a desiccant filter 30, a regeneration heater 40, an intake damper 50, an exhaust damper 60, and a controller (not shown).

The drying storage case 100 has an accommodation space S in which the object being dried may be accommodated. The case where the drying storage case 100 has a box shape, will be exemplified.

A receiving port 110 is formed on at least one surface of the drying storage case 100 so that the object being dried can be put in or withdrawn from the drying storage case 100 through the receiving port 110.

A drying storage intake port 101 and a drying storage exhaust port 102 are formed on the other surface of the drying storage case 100 to be spaced apart from each other by a certain distance.

The drying storage intake port 101 may be an intake port for inhaling outside air of the drying storage.

The drying storage exhaust port 102 is an exhaust port for exhausting air discharged from an exhaust chamber E of the dehumidifier case 10 to an outside of the drying storage.

The receiving port door 120 is coupled to the drying storage case 100 to open/close the receiving port 110. The case where the receiving port door 120 is rotatably coupled to one surface of the drying storage case 100, will be exemplified, but the present invention is not limited thereto, and any structure for opening/closing the receiving port 110 may be used.

The dehumidifier case 10 is installed on an inner surface of the drying storage case 100. The case where the dehumidifier case 10 is formed in a rectangular parallelepiped shape formed long in a flow direction of the air, will be exemplified. However, the present invention is not limited thereto, and the dehumidifier case 10 may also be installed on an outer surface of the drying storage case 100.

The inside of the dehumidifier case 10 is sequentially partitioned into an intake chamber A, a dehumidification chamber D, and the exhaust chamber E in the flow direction of the air.

The intake chamber A is a region in which the air of the accommodation space S is inhaled. An internal intake port 11*a* and an external intake port 11*b* are respectively formed in the intake chamber A. The airflow passage in the intake chamber A can be altered corresponding to the position of the intake damper 50 to be described below.

The internal intake port 11*a* is an intake port, which is formed on a surface facing the accommodation space S from the intake chamber A so as to inhale the air in the accommodation space S into the intake chamber A. The case where the internal intake port 11*a* is an opening hole, will be exemplified, but the present invention is not limited thereto, and an additional opening/closing member, a ventilation grill, or the like may also be installed.

The external intake port 11*b* in the intake chamber A is an intake port, which communicates with the drying storage intake port 101 so as to inhale the outside air inhaled from the drying storage intake port 101 into the intake chamber A. The case where the external intake port 11*b* is an opening hole, will be exemplified, but the present invention is not limited thereto, and an additional opening/closing member, a ventilation grill, or the like may also be installed. Also, an additional intake duct (not shown) may also be connected to the external intake port 11*b*.

The exhaust chamber E is a region in which the air introduced into the intake chamber A is discharged to the outside of the drying storage case 100 or the accommodation space S. An internal exhaust port 12*a* and an external exhaust port 12*b* are formed in the exhaust chamber E.

The internal exhaust port 12*a* in the exhaust chamber E of the dehumidifier case 10 is an exhaust port, which communicates with the accommodation space S so as to discharge the air in the exhaust chamber E to the inside of the accommodation space S. The case where the internal exhaust port 12*a* is an opening hole, will be exemplified, but the present invention is not limited thereto, and an additional opening/closing member, a ventilation grill, or the like may also be installed.

The external exhaust port 12*b* in the exhaust chamber E of the dehumidifier case 10 is an exhaust port, which communicates with the drying storage exhaust port 102 so as to discharge the air in the exhaust chamber E to the outside of the drying storage. The case where the external exhaust port 12*b* is an opening hole, will be exemplified, but the present invention is not limited thereto, and an additional opening/closing member, a ventilation grill, or the like may also be installed. In addition, an additional exhaust duct (not shown) may be connected to the external exhaust port 12*b* so as to guide the air to be discharged outdoors.

The dehumidification chamber D communicates between the intake chamber A and the exhaust chamber E to dehumidify the air inhaled from the intake chamber A and to guide the air to the exhaust chamber E. In the present embodiment, the case where the dehumidification chamber D is formed in a passage or duct shape, will be exemplified.

The regeneration heater 40, the desiccant filter 30, and the blower 20 are arranged in a row in the dehumidification chamber D.

The blower 20 allows the air in the dehumidifier case 10 to flow. That is, the blower 20 is a fan that inhales the air to blow the air in a direction toward the exhaust chamber E. In the present embodiment, the case where the blower 20 is installed in the dehumidifier case 10, will be exemplified, but the present invention is not limited thereto, and at any position including the outside of the dehumidifier case as long as the blower 20 may induce the air flow in the dehumidifier case.

The desiccant filter 30 is a filter that absorbs moisture in the air passing through the dehumidification chamber D when a dehumidification operation for absorbing moisture in the accommodation space S is performed. The desiccant filter 30 includes a desiccant material for absorbing moisture.

The desiccant material having an equilibrium moisture content of 20 wt % or less when the temperature of the ambient air is within a range of 10° C. to 30° C. and the relative humidity of the air is 20% or less, and having an equilibrium moisture content of 40 wt % or more when the temperature of the ambient air is within a range of 10° C. to 30° C. and the relative humidity of the air is 50% or more, is used. This is because the dehumidification performance of the desiccant material during the dehumidification operation is higher when the changes in the moisture content is larger between the state after the regeneration and subsequent natural cooling and the state at the equilibrium with the air of relative humidity 50%, the typical set value of the relative humidity.

In addition, the desiccant material having an equilibrium moisture content of 20 wt % or less when the temperature of the ambient air is within a range of 40° C. to 60° C. and the relative humidity of the air is 20% or less is, used. This is because regeneration of the desiccant material during the regeneration operation is performed more deeply when the equilibrium moisture content of the desiccant material is lower at the regeneration condition.

Because the regeneration temperature of general desiccant materials is usually high in the range of about 100° C. to 200° C., there are problems of excessive regeneration energy consumption and damage and deformation of surrounding components due to discharging of high-temperature regeneration air and thus, there are limitations of installation and usage.

In order to solve these problems, a selection criterion for a desiccant material suitable for low-temperature regeneration and securing a sufficient moisture absorption capacity during the dehumidification operation is arranged based on the equilibrium moisture content of the desiccant material.

According to a theoretical investigation, among parameters affecting the dehumidification performance of the desiccant material, the characteristics of the desiccant material can be summarized into two parameters, K (thermal capacity) and $\sigma$ (sorption capacity).

In addition, it was experimentally derived that, when a time interval between the regeneration process and the dehumidification process is sufficiently long, the effect of the thermal capacity K of the desiccant material becomes negligible, and only the sorption capacity $\sigma$ has a dominant effect.

In addition, among the many parameters comprising the sorption capacity $\sigma$, the only parameter relevant to the intrinsic property of the desiccant material was derived as the gradient of the equilibrium moisture content of the desiccant material according to an increase in humidity when the temperature is constant. This parameter is interpreted as a difference between the equilibrium moisture contents at the beginning and at the end of the dehumidification process.

Thus, in the present invention, the difference between the equilibrium moisture content at the beginning of the dehumidification process and the equilibrium moisture content at the end of the dehumidification process, i.e., the moisture absorption capacity of the desiccant material was suggested as a parameter for a selection criterion of the suitable desiccant material.

That is, the appropriate range for the suitable desiccant material was limited so that the difference in equilibrium moisture contents at between time point ① before the dehumidification operation started and time point ② after the dehumidification operation finished was 20 wt % or more. The desiccant material not only having a high equilibrium moisture content but also having a large increase in the equilibrium moisture content was selected in consideration of the ambient air temperature and the relative humidity so that regeneration energy consumption can be reduced and efficient dehumidification can be performed.

Figure 4:
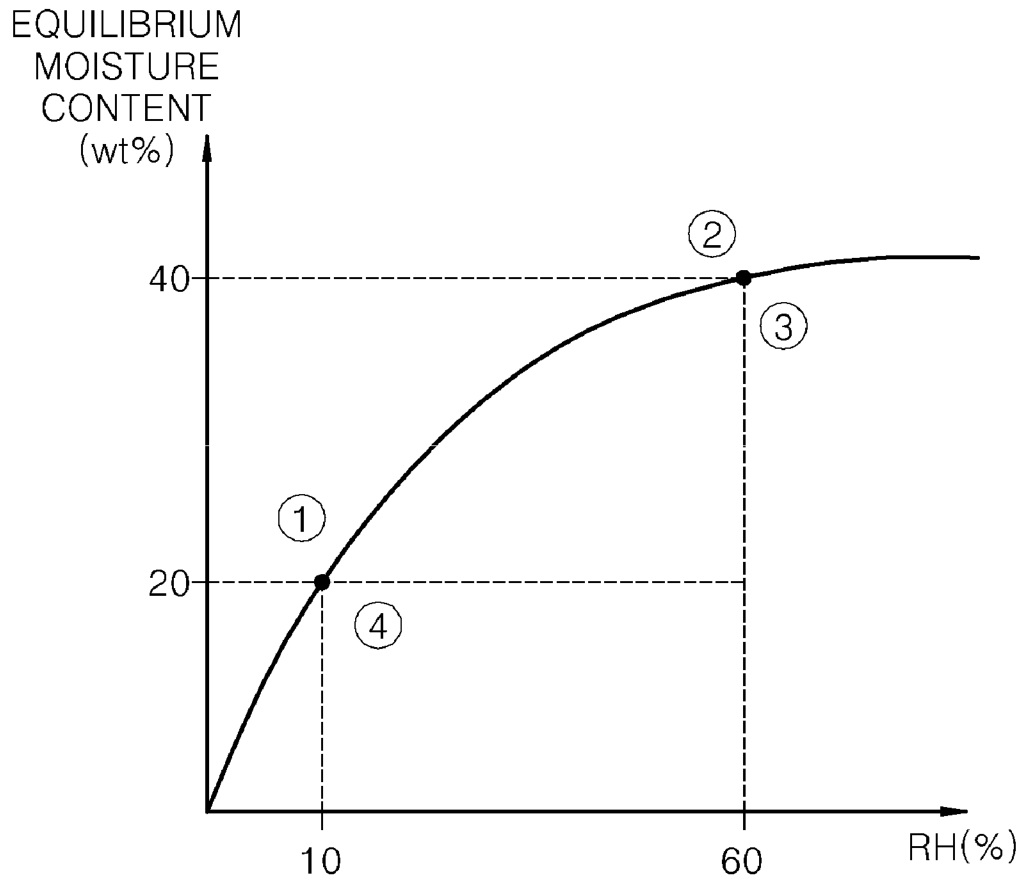
FIG. 4 is a graph showing changes in a moisture content of a desiccant material in an equilibrium state according to relative humidity according to an embodiment of the present invention.
Figure 5:
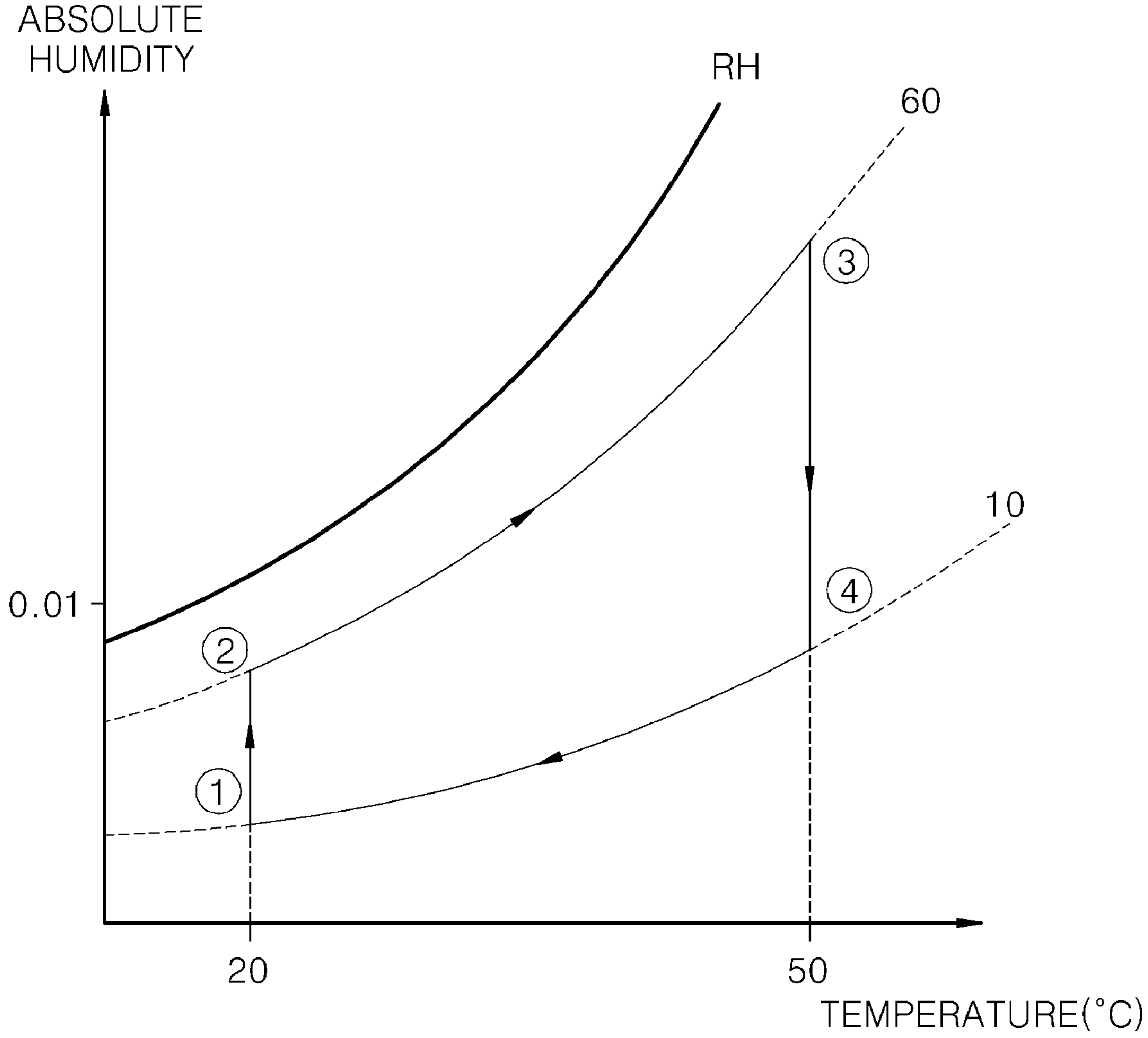
FIG. 5 is a graph showing equilibrium psychrometric states of the air on the surface of a desiccant material according to an embodiment of the present invention, which shows ideal cycle states.

FIG. 4 is a graph showing changes in a moisture content of a desiccant material in an equilibrium state according to relative humidity according to an embodiment of the present invention. FIG. 5 is a graph showing equilibrium psychrometric states of the air on the surface of a desiccant material according to an embodiment of the present invention, which shows ideal cycle states.

The equilibrium psychrometric air states on the surface of the desiccant material when a cycle operation including the dehumidification operation and the regeneration operation is performed periodically or on demand, will be described with reference to FIGS. 4 and 5.

At time point ① when the desiccant material is regenerated at a previous regeneration operation and cooled naturally afterward, the temperature of the air is in the range of about 10° C. to 30° C. as the ambient air, and the relative humidity is 20% or less as that of the air in equilibrium with the surface of the desiccant material. Here, it is assumed that the temperature at time point ① is 20° C. and the equilibrium relative humidity is 10%.

Also, at time point ② at which the dehumidification operation is completed, the temperature of the air is also in the range of about 10° C. to 30° C. as the ambient air, and the relative humidity of the ambient air is about 50% or more. Here, it is assumed that the temperature at time point ② is 20° C. and the relative humidity is 60%.

Then, at time point ①, the equilibrium moisture content of the desiccant material is 20 wt % or less, and at time point ②, the equilibrium moisture content of the desiccant material is 40 wt % or more. Thus, because the difference in the equilibrium moisture content of the desiccant material is large between time point ① and time point ②, dehumidification during the dehumidification operation can be performed effectively.

Also, when the regeneration operation is performed, the temperature of the regeneration air is in the range of 40° C. to 60° C., and the relative humidity of the regeneration air is 20% or less. Here, it is assumed that the regeneration temperature is 50° C. and the relative humidity is 10%.

Because, as the regeneration operation is performed, the desiccant material equilibrates the air having the temperature of 50° C. and relative humidity of 10%, i.e., the air having the temperature and relative humidity at time point ④, the regeneration of the desiccant material can be carried out during the regeneration operation only when the equilibrium moisture content of the desiccant material is reduced to 20 wt % or less on these conditions.

Also, a material capable of sufficient regeneration even when the regeneration temperature is 60° C. or less is used as the desiccant material, so that deformation or damage of the drying storage or items around the exhaust port 102 of the drying storage due to the hot and humid regeneration air can be prevented.

A desiccant material disclosed in Korean Patent Registration No. 10-0963116 can be used as the desiccant material, but the present invention is not limited thereto, and various desiccant materials can be used.

The regeneration heater 40 is a heating device that heats the air introduced from the intake chamber A and allows the air to flow into the desiccant filter 30 so as to regenerate the desiccant filter 30. The regeneration heater 40 is disposed upstream of the desiccant filter 30 inside the dehumidification chamber D.

The intake damper 50 is a damper that is provided inside the intake chamber A and selectively opens/closes the internal intake port 11*a*, the external intake port 11*b* and the entrance of the dehumidification chamber D according to an operation mode including the dehumidification operation and the regeneration operation. The intake damper 50 is a three-way damper that is rotatably installed in the inner center of the intake chamber A and selectively opens/closes at least a portion of the internal intake port 11*a*, the external intake port 11*b* and the entrance of the dehumidification chamber D to control the flow direction of the air.

The exhaust damper 60 is a damper that is provided inside the exhaust chamber E to selectively open/close the internal exhaust port 12*a*, the external exhaust port 12*b* and the exit of the dehumidification chamber D according to an operation mode including the dehumidification operation and the regeneration operation. The exhaust damper 60 is a three-way damper that is rotatably installed in the center of the inside of the exhaust chamber E and selectively opens/closes at least a portion of the internal exhaust port 12*a*, the external exhaust port 12*b* and the exit of the dehumidification chamber D to control the discharge direction of the air.

Meanwhile, a plurality of temperature sensors for measuring the temperature of the air and a plurality of humidity sensors for measuring the humidity of the air are installed inside the drying storage case 100 or the dehumidifier case 10.

Hereinafter, in the present embodiment, the case where the plurality of temperature sensors include an intake air temperature sensor, a regeneration air temperature sensor, and an exhaust air temperature sensor installed inside the dehumidifier case 10, will be exemplified.

The intake air temperature sensor is installed at the entrance of the dehumidification chamber D and measures the temperature of the intake air inhaled into the intake chamber A. However, the present invention is not limited thereto, and the intake air temperature sensor may also be installed in the intake chamber A, on an outer surface facing the accommodation space S, or in the accommodation space S.

The regeneration air temperature sensor is installed at an outlet side of the regeneration heater 40 in the dehumidification chamber D, to measure the temperature of the regeneration air for regenerating the desiccant filter 30.

The exhaust air temperature sensor is installed at the exit of the dehumidification chamber D and measures the temperature of exhaust air discharged through the exhaust chamber E. However, the present invention is not limited thereto, and the exhaust air temperature sensor may also be installed in the exhaust chamber E.

The plurality of humidity sensors include an intake air humidity sensor and an exhaust air humidity sensor.

The intake air humidity sensor is installed at the entrance of the dehumidification chamber D and measures the humidity of the indoor air inhaled into the intake chamber A. However, the present invention is not limited thereto, and the intake air humidity sensor may also be installed in the intake chamber A, on the outer surface facing the accommodation space S, or in the accommodation space S.

The exhaust air humidity sensor is installed at the exit of the dehumidification chamber D and measures the humidity of exhaust air discharged through the exhaust chamber E. However, the present invention is not limited thereto, and the exhaust air humidity sensor may also be installed in the exhaust chamber E.

Also, the drying storage may further include a dew point temperature detector for detecting the dew point temperature of the exhaust air.

The dew point temperature detector (not shown) may be a dew point hygrometer that measures the dew point temperature of the exhaust air, or a dew point temperature evaluation unit that evaluates the dew point temperature using the temperature and humidity of the exhaust air.

Also, the drying storage further includes a controller (not shown) for controlling the operation of the regeneration heater 40, the intake damper 50, and the exhaust damper 60 according to the operation mode.

The controller (not shown) may evaluate the dew point temperature directly using the temperature and humidity of the exhaust air.

The operation of the drying storage according to an embodiment having the above structure will be described.

The dehumidification operation of the drying storage may also be performed according to the humidity of the intake air inhaled into the intake chamber A, may also be performed according to the humidity of the accommodation space S, may also be performed when a user inputs a start signal for the dehumidification operation, or may also be performed according to a dehumidification schedule preset by the user.

Hereinafter, in the present embodiment, the case where the dehumidification operation is performed according to the humidity of the intake air inhaled into the intake chamber A, will be described.

The controller (not shown) controls the intake damper 50 to open the internal intake port 11*a* and the entrance of the dehumidification chamber D, operates the blower 20 so that the inside air in the accommodation space S is inhaled into the intake chamber A.

The controller (not shown) starts the dehumidification operation when the humidity of the intake air measured by the intake air humidity sensor exceeds preset humidity.

Figure 2:
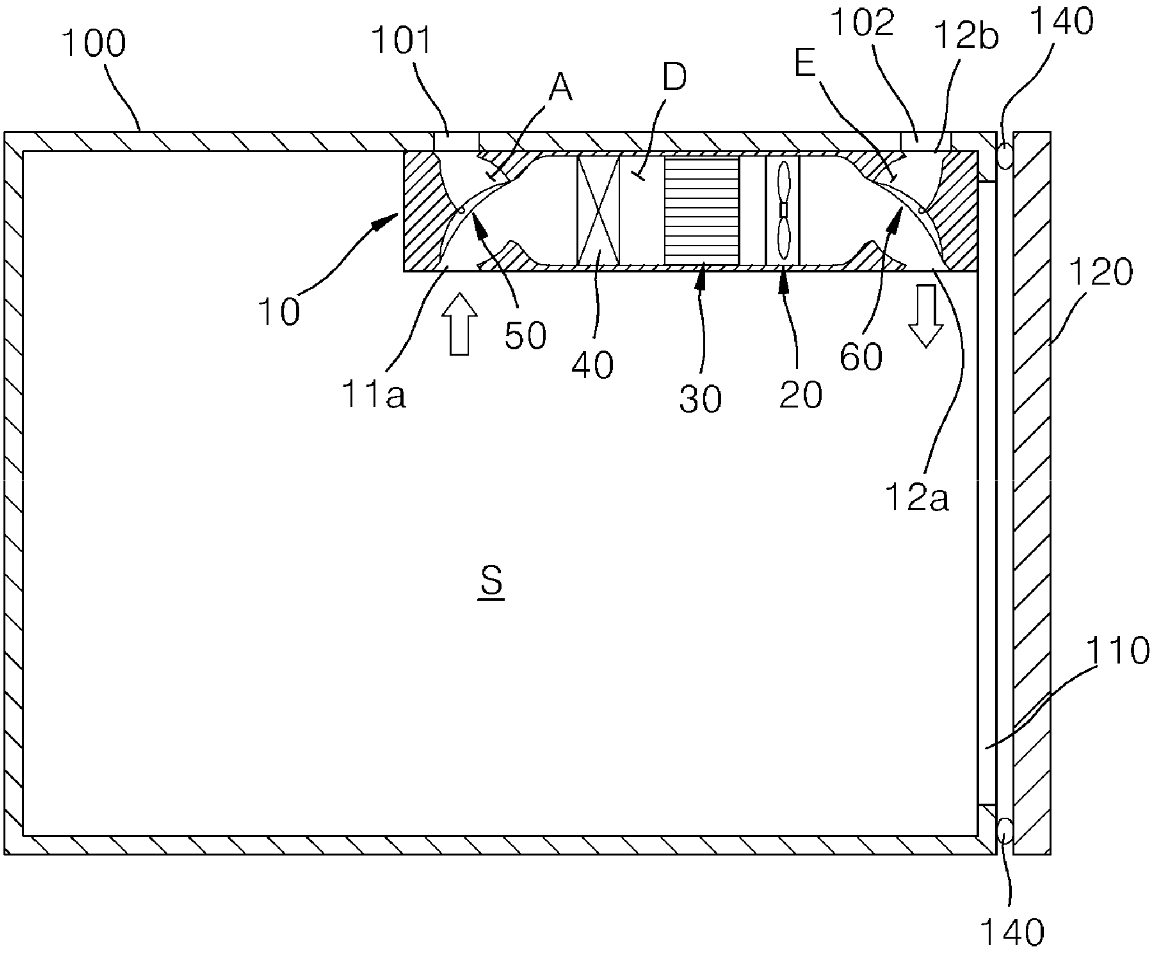
FIG. 2 is a view illustrating a dehumidification operation of the drying storage shown in FIG. 1.

FIG. 2 is a view illustrating the dehumidification operation of the drying storage shown in FIG. 1.

Referring to FIG. 2, during the dehumidification operation, the controller (not shown) operates the blower 20 and stops the operation of the regeneration heater Also, the controller (not shown) controls the intake damper 50 to open the internal intake port 11*a* and the entrance of the dehumidification chamber D and to close the external intake port 11*b*.

Also, the controller (not shown) controls the exhaust damper 60 to open the exit of the dehumidification chamber D and the internal exhaust port 12*a* and to close the external exhaust port 12*b*.

When the blower 20 operates, the inside air in the accommodation space S is inhaled into the intake chamber A through the internal intake port 11*a*.

The air inhaled into the intake chamber A is inhaled into the dehumidification chamber D.

The air introduced into the dehumidification chamber D passes through the desiccant filter 30, the moisture of the air is removed and then the air is introduced into the exhaust chamber E.

In the present embodiment, because the desiccant material having an equilibrium moisture content of 40 wt % or more when the temperature of the ambient air is in the range of 10° C. to 30° C. and the relative humidity of the ambient air is 50% or more is used, during the dehumidification operation, moisture in the inside air in the accommodation space S can be absorbed effectively, and the dehumidification of the air can be performed.

The air introduced into the exhaust chamber E is discharged into the accommodation space S through the internal exhaust port 12*a*.

Thus, during the dehumidification operation, the inside air in the accommodation space S is inhaled into the dehumidifier case 10 to be dehumidified and then is discharged again into the accommodation space S. The process repeats until the humidity in the accommodation space reaches the preset value.

When the humidity of the intake air measured by the intake air humidity sensor is equal to or less than the preset humidity, the controller (not shown) terminates the dehumidification operation.

Also, when the rate of change of the temperature of the exhaust air measured by the exhaust air temperature sensor is equal to or less than a preset rate of change, the controller (not shown) may terminate the dehumidification operation. When the change in temperature of the exhaust air passing through the desiccant filter 30 is within a preset temperature difference for a set time duration, it is determined that the desiccant filter 30 is saturated with moisture and the dehumidification operation may be terminated. Here, the case where the set time duration is 1 minute and the temperature difference is 1° C., will be exemplified. That is, as moisture in the air is absorbed while passing through the desiccant filter 30, the humidity of the air decreases and the temperature of the air increases due to the release of absorption heat. As the desiccant filter 30 is saturated with the absorbed moisture, the moisture removal rate decreases gradually, the change in temperature and humidity almost disappears. Then the dehumidification operation may be terminated since the dehumidification may not be accomplished further due to the saturation of the desiccant filter 30.

Meanwhile, the controller (not shown) performs the regeneration operation immediately after the dehumidification operation is terminated.

Figure 3:
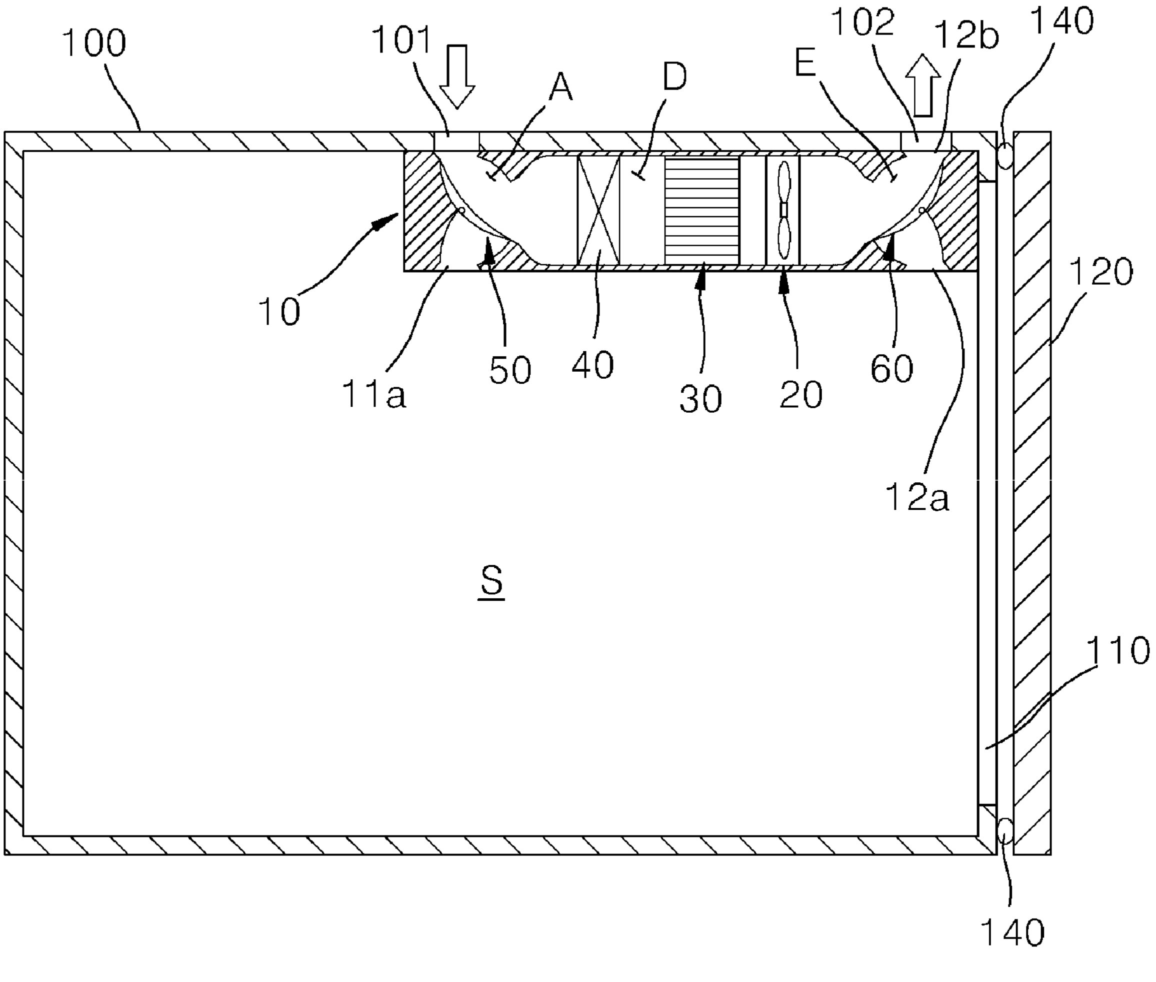
FIG. 3 is a view illustrating a regeneration operation of the drying storage shown in FIG. 1.

FIG. 3 is a view illustrating the regeneration operation of the drying storage shown in FIG. 1.

Referring to FIG. 3, during the regeneration operation, the controller (not shown) operates both the blower 20 and the regeneration heater 40.

Also, the controller (not shown) controls the intake damper 50 to close the internal intake port 11*a* and to open the external intake port 11*b* and the entrance of the dehumidification chamber D.

Also, the controller (not shown) controls the exhaust damper 60 to close the internal exhaust port 12*a* and to open the external exhaust port 12*b* and the exit of the dehumidification chamber D.

When the internal intake port 11*a* is closed and the external intake port 11*b* is opened, the outside air of the drying storage case 100 is inhaled into the intake chamber A through the drying storage intake port 101 and the external intake port 11*b*. In the present embodiment, the outside air of the drying storage case 100 is inhaled and is used in the regeneration operation.

The air inhaled into the intake chamber A is introduced into the dehumidification chamber D.

The air introduced into the dehumidification chamber D passes through the regeneration heater 40 and is heated.

The high-temperature air heated by the regeneration heater 40 may pass through the desiccant filter 30 to desorb the moisture absorbed in the desiccant filter and to regenerate the desiccant filter 30.

In the present embodiment, the desiccant material of the desiccant filter 30 having the characteristics of an equilibrium moisture content of 20 wt % or less when the temperature of the ambient air is in the range of 40° C. to 60° C. and the relative humidity is 20% or less is used, so that a sufficient regeneration can be obtained in the conditions of the regeneration operation.

The air discharged after regenerating the desiccant filter 30 is introduced into the exhaust chamber E, and is discharged to the outside of the drying storage case 100 through the external exhaust port 12*b* and the drying storage exhaust port 102.

In this case, the controller (not shown) controls the operation of the regeneration heater 40 or the blower 20 so that the regeneration temperature of the desiccant filter 30 is 60° C. or less. That is, because typical temperature limit of general plastic household products is about 60° C., the regeneration temperature of the desiccant filter 30 is controlled to be 60° C. or less. Then, due to the high-temperature air discharged through the drying storage exhaust port 102, damage of the drying storage itself or surrounding items of the drying storage can be prevented.

Meanwhile, when a difference between the temperature of the regeneration air measured by the regeneration air temperature sensor and the temperature of the discharge air measured by the discharge air temperature sensor is within a preset minimum temperature difference, the regeneration operation is terminated.

Here, the case where the minimum temperature difference is 1° C., will be exemplified. During the regeneration operation, when the temperature of the discharge air measured by the discharge air temperature sensor increases gradually and becomes nearly similar to the temperature of the regeneration air discharged from the regeneration heater 40 within the temperature difference of 1° C., it may be determined that the regeneration of the desiccant filter 30 is completed, and the regeneration operation may be terminated.

However, the present invention is not limited thereto, and the regeneration operation may also be terminated when a preset regeneration operation time has elapsed, When the regeneration operation is terminated, the controller (not shown) stops the operation of the blower 20 and the regeneration heater 40. Also, the controller (not shown) controls the intake damper 50 to close the entrance of the dehumidification chamber D and the exhaust damper 60 to close the exit of the dehumidification chamber D.

During the regeneration operation, the controller (not shown) may detect the dew point temperature of the exhaust air discharged from the dehumidification chamber D to the exhaust chamber E.

The dew point temperature may be detected using a dew point hygrometer and may also be evaluated using temperature measured by the discharge air temperature sensor and humidity measured by the exhaust air humidity sensor. 25

The controller (not shown) compares the dew point temperature of the discharge air with a preset temperature range. Here, the preset temperature range may be set as a condensation temperature and may also be set as a range between the minimum temperature lower than the condensation temperature by a predetermined temperature difference and the maximum temperature higher than the condensation temperature by a predetermined temperature difference.

When the dew point temperature of the discharge air exceeds the maximum temperature in the preset temperature range, the power of the regeneration heater is reduced so that the temperature of the regeneration air decreases. When the temperature of the regeneration air decreases, the dew point temperature of the discharge air decreases also and thus, condensation can be prevented.

While the power of the regeneration heater 40 is reduced, the controller (not shown) compares the temperature of the regeneration air with a preset minimum value. Here, the minimum value is determined through experiments etc. in consideration of the regeneration efficiency of the desiccant filter 30. The temperature of the regeneration air is controlled equal to or higher than the minimum value by controlling the power of the regeneration heater 40. That is, the temperature of the regeneration air is controlled within a range to prevent any condensation and to maintain a sufficient regeneration performance.

The controller (not shown) examines whether the difference between the temperature of the regeneration air measured by the regeneration air temperature sensor and the temperature of the discharge air measured by the discharge air temperature sensor decreases lower than a preset minimum temperature difference. When the difference between the temperature of the regeneration air and the temperature of the discharge air is less than the set temperature difference, the power of the regeneration heater 40 is increased so that the temperature of the regeneration air may increase.

When the temperature of the regeneration air is higher than the temperature of the discharge air by the set temperature difference or more, the regeneration filter can be regenerated effectively. Thus, when the difference between the temperature of the regeneration air and the temperature of the discharge air is less than the set temperature difference, it is decided that the regeneration of the regeneration filter 30 is not effective, and the power of the regeneration heater 40 is increased so that the temperature of the regeneration air may increase.

In the present embodiment, the case where the set temperature difference is set as a certain value i.e., 5° C., will be exemplified. However, the present invention is not limited thereto, and the set temperature difference may also be set as a variable not being a fixed constant according to the elapsed time from the beginning of the regeneration operation. That is, the set temperature difference may be set as an initial value at the beginning of the regeneration operation, and as the operation time elapses, the set temperature difference may be gradually increased greater than the initial value. Also, the set temperature difference may also be set in a predetermined range.

While the power of the regeneration heater 40 is increased, the temperature of the regeneration air is compared with a preset maximum value. Here, the case where the maximum value is 60° C., will be exemplified. When the temperature of the regeneration air is equal to or higher than the maximum value, increase of the power of the regeneration heater 40 is stopped.

This prevents overheating or burnout due to the excessive increase of the regeneration temperature.

In the present embodiment, the case where a plurality of sensors for measuring the temperature and humidity are installed in the dehumidifier case 10 and the controller (not shown) controls the operations according to values detected by the plurality of sensors, has been exemplified.

However, the present invention is not limited thereto, and each of a temperature sensor and a humidity sensor may be provided in the drying storage case 100 so that the controller (not shown) controls the operations of the blower 20, the regeneration heater 40, the intake damper 50 and the exhaust damper 60 according to the temperature and humidity of the accommodation space S.

In addition, without any sensors, the dehumidification operation and the regeneration operation may be proceeded in a preset schedule so that the controller (not shown) controls the operations of the blower 20, the regeneration heater 40, the intake damper 50, and the exhaust damper 60 according to the scheduled time and duration. In this case, the time schedule may be adjusted by the user.

In addition, a display unit (not shown) for displaying the operating states of the regeneration operation and the dehumidification operation and the temperature and humidity of the accommodation space S may be further included on the outer surface of the drying storage case 100 or the outer surface of the receiving port door 120.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A drying storage, which can be carried or moved by a user or is installed as a built-in in the user's residence and in which an object being dried is kept in a dried state, the drying storage comprising:

a drying storage case having a receiving port through which the object being dried is capable of being put in or withdrawn and having an accommodation space in which the object being dried is capable of being accommodated;

a receiving port door coupled to the drying storage case to open/close the receiving port;

a dehumidifier case comprising an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber;

a blower configured to flow the air in the dehumidifier case;

a desiccant filter disposed in the dehumidification chamber and including a desiccant material for absorbing moisture in the air introduced from the intake chamber during a dehumidification operation;

a regeneration heater configured to heat air introduced from the intake chamber and to allow the air to flow into the desiccant filter so as to regenerate the desiccant filter during a regeneration operation; and a controller configured to control an operation of the blower and the regeneration heater, wherein the desiccant material has an equilibrium moisture content of 20 wt % or less when a temperature of an ambient air is in a range of 10° C. to 30° C. and relative humidity is 20% or less and has an equilibrium moisture content of 40 wt % or more when the temperature of the ambient air is in a range of 10° C. to 30° C. and relative humidity is 50% or more so that a moisture absorption capacity increases during the dehumidification operation, and the controller is further configured to control the regeneration heater or the blower so that the regeneration temperature of the desiccant filter is 60° C. or less so as to prevent damage of the drying storage itself or surrounding items of the drying storage due to high-temperature air discharged from the exhaust chamber during the regeneration operation, and the desiccant material has an equilibrium moisture content of 20 wt % or less when the temperature of the ambient air is 40° C. to 60° C. and relative humidity is 20% or less so that a regeneration ability is enhanced in the regeneration operation.

2. The drying storage of claim 1, further comprising a sealing member provided between the receiving port and the receiving port door to seal the accommodation space.

3. The drying storage of claim 1, further comprising:

a drying storage intake port, which is formed in the drying storage case and through which outside air of the drying storage is inhaled;

an external intake port in the intake chamber of the dehumidifier case, which communicates with the drying storage intake port and through which outside air is inhaled into the intake chamber; and an internal intake port in the intake chamber of the dehumidifier case, which communicates with the accommodation space and through which inside air of the accommodation space is inhaled into the intake chamber.

4. The drying storage of claim 3, further comprising an intake damper, which is rotatably coupled to the intake chamber and selectively opens/closes the external intake port, the internal intake port and an entrance of the dehumidification chamber according to an operation mode including the dehumidification operation and the regeneration operation.

5. The drying storage of claim 4, wherein the controller is further configured to control the intake damper to open the internal intake port and the entrance of the dehumidification chamber and to close the external intake port during the dehumidification operation, and the controller is further configured to control the intake damper to close the internal intake port and to open the external intake port and the entrance of the dehumidification chamber during the regeneration operation, and when the regeneration operation is terminated, the controller is further configured to control the intake damper to close the entrance of the dehumidification chamber.

6. The drying storage of claim 1, further comprising:

a drying storage exhaust port, which is formed in the drying storage case and through which air discharged from the exhaust chamber is discharged to an outside of the drying storage;

an external exhaust port in the exhaust chamber of the dehumidifier case, which communicates with the drying storage exhaust port and through which air in the exhaust chamber is discharged to an outside of the drying storage; and an internal exhaust port in the exhaust chamber of the dehumidifier case, which communicates with the accommodation space and through which air in the exhaust chamber is discharged to an inside of the accommodation space.

7. The drying storage of claim 6, further comprising an exhaust damper, which is rotatably coupled to the exhaust chamber and selectively opens/closes the external exhaust port, the internal exhaust port, and an exit of the dehumidification chamber according to an operation mode including the dehumidification operation and the regeneration operation.

8. The drying storage of claim 7, wherein the controller is further configured to control the exhaust damper to open the internal exhaust port and the exit of the dehumidification chamber and to close the external exhaust port during the dehumidification operation, and the controller is further configured to control the exhaust damper to close the internal exhaust port and to open the external exhaust port and the exit of the dehumidification chamber during the regeneration operation, and when the regeneration operation is terminated, the controller is further configured to control the exhaust damper to close the exit of the dehumidification chamber.

9. A drying storage, which can be carried or moved by a user or is installed as a built-in in the user's residence and in which an object being dried is kept in a dried state, the drying storage comprising:

a drying storage case having a receiving port through which the object being dried is capable of being put in or withdrawn and having an accommodation space in which the object being dried is capable of being accommodated;

a receiving port door coupled to the drying storage case to open/close the receiving port;

a sealing member provided between the receiving port and the receiving port door and configured to seal the accommodation space;

a dehumidifier case comprising an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber;

a blower configured to flow air in the dehumidifier case;

a desiccant filter disposed in the dehumidification chamber and including a desiccant material for absorbing moisture in the air introduced from the intake chamber during a dehumidification operation;

a regeneration heater configured to heat the air introduced from the intake chamber and to allow the air to flow into the desiccant filter so as to regenerate the desiccant filter during a regeneration operation;

a drying storage intake port, which is formed in the drying storage case and through which outside air of the drying storage is inhaled;

an external intake port in the intake chamber of the dehumidifier case, which communicates with the drying storage intake port and through which outside air is inhaled into the intake chamber;

an internal intake port in the intake chamber of the dehumidifier case, which communicates with the accommodation space and through which inside air of the accommodation space is inhaled into the intake chamber;

an intake damper, which is rotatably coupled to the intake chamber and selectively opens/closes the external intake port, the internal intake port and an entrance of the dehumidification chamber according to an operation mode including the dehumidification operation and the regeneration operation;

a drying storage exhaust port, which is formed in the drying storage case and through which air discharged from the exhaust chamber is discharged to an outside of the drying storage;

an external exhaust port in the exhaust chamber of the dehumidifier case, which communicates with the drying storage exhaust port and through which the air in the exhaust chamber is discharged to an outside of the drying chamber;

an internal exhaust port in the exhaust chamber of the dehumidifier case, which communicates with the accommodation space and through which the air in the exhaust chamber is discharged to an inside of the accommodation space;

an exhaust damper, which is rotatably coupled to the exhaust chamber and selectively opens/closes the external exhaust port, the internal exhaust port and an exit of the dehumidification chamber according to an operation mode including the dehumidification operation and the regeneration operation; and a controller configured to control an operation of the blower, the regeneration heater, the intake damper and the exhaust damper, wherein the desiccant material has an equilibrium moisture content of 20 wt % or less when a temperature of an ambient air is in a range of 10° C. to 30° C. and relative humidity is 20% or less and has an equilibrium moisture content of 40 wt % or more when the temperature of the ambient air is in a range of 10° C. to 30° C. and relative humidity is 50% or more so that a moisture absorption capacity increases during the dehumidification operation, and the controller is further configured to control the regeneration heater or the blower so that the regeneration temperature of the desiccant filter is 60° C. or less so as to prevent damage of the drying storage itself or surrounding items of the drying storage due to high-temperature air discharged from the exhaust chamber during the regeneration operation, and the desiccant material has an equilibrium moisture content of 20 wt % or less when the temperature of the ambient air is 40° C. to 60° C. and relative humidity is 20% or less so that a regeneration ability is enhanced in the regeneration operation.

10. A drying storage, which can be carried or moved by a user or is installed as a built-in in the user's residence and in which an object being dried is kept in a dried state, the drying storage comprising:

a drying storage case having a receiving port through which the object being dried is capable of being put in or withdrawn and having an accommodation space in which the object being dried is capable of being accommodated;

a receiving port door coupled to the drying storage case to open/close the receiving port;

a dehumidifier case comprising an intake chamber in which air in the accommodation space is inhaled, an exhaust chamber in which air introduced into the intake chamber is discharged, and a dehumidification chamber, which communicates between the intake chamber and the exhaust chamber and in which air introduced from the intake chamber is dehumidified to be guided to the exhaust chamber, the dehumidifier case being disposed inside the drying storage case;

a blower configured to flow air in the dehumidifier case;

a desiccant filter disposed in the dehumidification chamber and including a desiccant material for absorbing moisture in air introduced from the intake chamber during a dehumidification operation;

a regeneration heater configured to heat the air introduced from the intake chamber and to allow the air to flow into the desiccant filter so as to regenerate the desiccant filter during a regeneration operation; and a controller configured to control an operation of the blower and the regeneration heater, wherein the desiccant material has an equilibrium moisture content of 20 wt % or less when a temperature of an ambient air is in a range of 10° C. to 30° C. and relative humidity of the air is 20% or less and has an equilibrium moisture content of 40 wt % or more when the temperature of the ambient air is in a range of 10° C. to 30° C. and the relative humidity of air is 50% or more so that a moisture absorption capacity increases during the dehumidification operation, and the controller is further configured to control the regeneration heater or the blower so that the regeneration temperature of the desiccant filter is 60° C. or less so as to prevent damage of the drying storage itself or surrounding items of the drying storage due to high-temperature regeneration air discharged from the exhaust chamber during the regeneration operation, and the desiccant material has an equilibrium moisture content of 20 wt % or less when the temperature of the ambient air is in a range of 40° C. to 60° C. and the relative humidity of air is 20% or less so that a regeneration ability is enhanced in the regeneration operation, and the desiccant material has an equilibrium with the air of relative humidity 20% or less at a time point when the desiccant material is regenerated in the previous regeneration operation and cooled naturally before the next dehumidification operation starts.

* * * * *